Oct. 4, 1960
H. G. BRILMYER
2,954,718
HOLLOW RIVET WITH OFFSET MANDREL HEAD TO
CAUSE CANTING OF THE RIVET BODY
Filed July 22, 1957
2 Sheets-Sheet 2
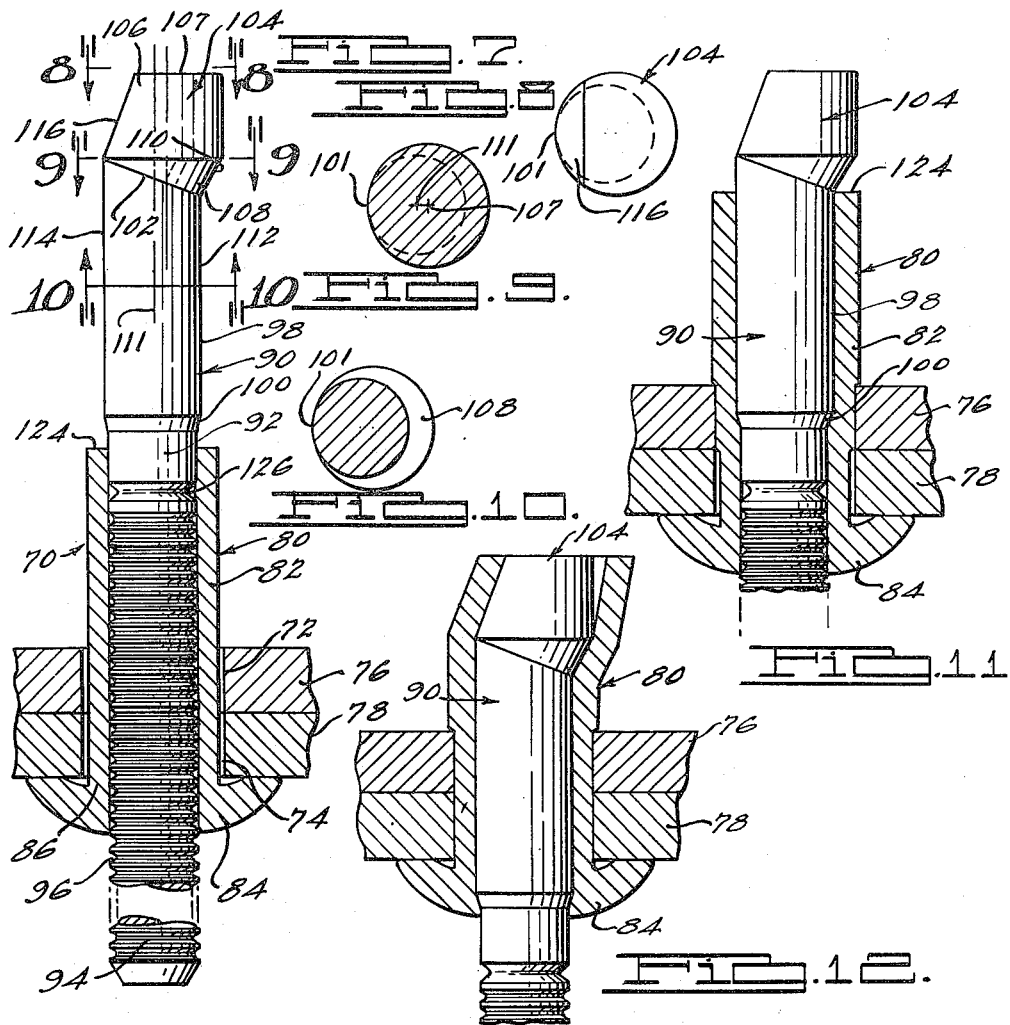
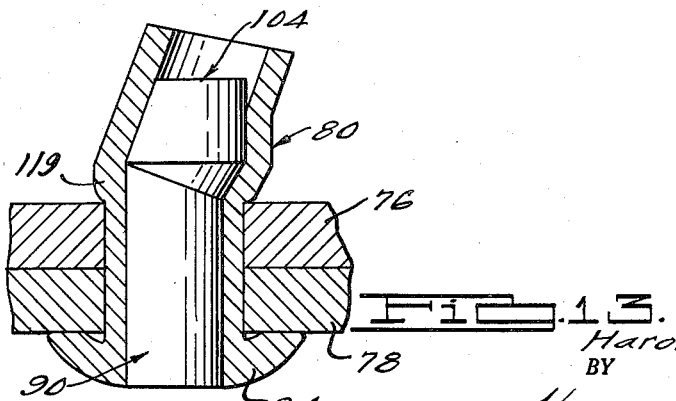
INVENTOR.
Harold G. Brilmyer,
BY
Harness, Dickey & Pierce
ATTORNEYS.

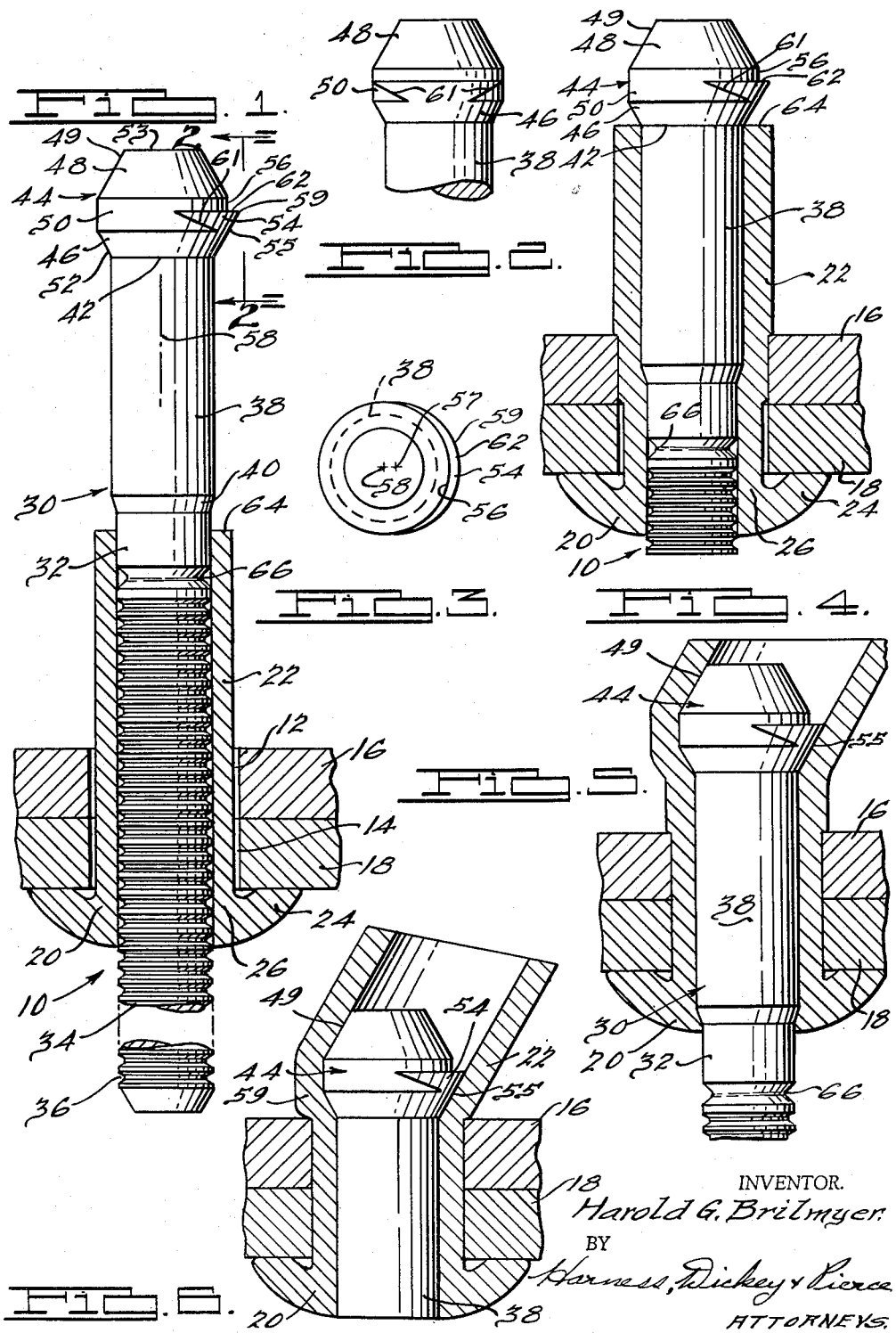

United States Patent Office 2,954,718
Patented Oct. 4, 1960

2,954,718

HOLLOW RIVET WITH OFFSET MANDREL HEAD TO CAUSE CANTING OF THE RIVET BODY

Harold G. Brilmyer, Grosse Pointe, Mich., assignor to Huck Manufacturing Company, a corporation of Michigan Filed July 22, 1957, Ser. No. 673,506

3 Claims. (Cl. 85—40)

This invention relates generally to fastening devices and more particularly to a blind rivet.

Blind rivets, namely rivets which are applied from one side only of the work, commonly include a sleeve or tubular rivet body and a pin or stem extending through the sleeve. In setting the rivet, the sleeve and pin assembly is first positioned in the openings in the work parts which are to be connected, after which the pin is pulled into the sleeve to expand the sleeve so that it fits tightly within the openings. The pin is of a size such that it also fits tightly within the sleeve to maintain the sleeve in an expanded condition. Usually, only the frictional contact between the pin and the sleeve is relied upon the hold the pin in the sleeve and maintain the connecting function of the rivet. The rivet shown in Austin Patent No. 2,756,624, issued July 31, 1956, is intended to provide a blind rivet in which the sleeve positively blocks loosening movement of the pin in the set position of the rivet.

The primary object of this invention is to provide an improved rivet of the positive blocking type which is readily produced in quantity and which provides a blocking action of the sleeve on the pin which is more positive than the corresponding action achieved in the rivet shown in the Austin patent.

A further object of this invention is to provide a blind rivet in which the sleeve is tilted or tipped into a following relation with the pin on movement of the pin into the sleeve to effectively block movement of the pin in a reverse direction.

Still a further object of this invention is to provide a blind rivet of the positive blocking type which is simple in construction, economical to manufacture, and which is readily applied in use.

Further objects, features and advantages of this invention will become apparent from a consideration of the following description, the appended claims and the accompanying drawing in which:

Figure 1 is a sectional view of a pair of plates or panels to be connected and one form of the blind rivet of this invention, illustrated in assembly relation with the plates prior to any setting operation on the rivet;

Fig. 2 is a fragmentary elevational view looking substantially along the line 2—2 in Fig. 1, of the head portion of the rivet illustrated in Fig. 1;

Fig. 3 is a top plan view of the rivet of Fig. 1;

Fig. 4 is a fragmentary sectional view similar to Fig. 1 showing the rivet in an initial stage of setting;

Fig. 5 is a fragmentary sectional view showing the rivet in an intermediate stage of setting in which the blind side of the rivet is forming;

Fig. 6 is a view similar to Fig. 5 showing the rivet in a final set position in which the blind side of the rivet is formed;

Fig. 7 is a sectional view of a pair of plates or panels to be connected, and showing a modified form of the blind rivet of this invention in assembly relation therewith prior to any setting operation;

Fig. 8 is a top plan view of the pin in the rivet shown in Fig. 7, as seen along the line 8—8 in Fig. 7;

Figs. 9 and 10 are transverse sectional views looking along the lines 9—9 and 10—10, respectively, in Fig. 7;

Figs. 11 and 12 are sectional views similar to Fig. 7 showing the rivet of this invention in progressively moved intermediate stages of setting; and Fig. 13 is a view similar to Fig. 1, showing the rivet in a final set position.

With reference to the drawings, one form of blind rivet of this invention, indicated generally at 10, is illustrated in Fig. 1, positioned within a pair of aligned openings 12 and 14 in a pair of plates or panels 16 and 18, respectively. The rivet 10 includes a sleeve member 20 having a tubular body portion 22 of a size to be received in the openings 12 and 14 with a small clearance between the tubular portion 22 and the plates 16 and 18 as illustrated in Fig. 1. An enlarged annular head 24, of conventional shape, is formed on the accessible end 26 of the body 22, hereinafter referred to as the outer end for convenience in description.

The rivet 14 also includes an elongated pin or stem 30 extended axially through the sleeve 22. The pin 30 has an elongated cylindrical shank portion 32 which is formed with an outer end section 34 of a diameter to provide for a sliding fit thereof in the tubular body portion 22 of the sleeve 20. The section 34 of the shank 32 is also formed with pull grooves 36 for adapting the rivet 10 for use with riveting guns (not shown) adapted to engage the pin 30 at the pull grooves 36. An inner end section 38 of the shank portion 32 is of a slightly larger diameter than the outer end section 34 and is connected to the section 34 by a short tapered section 40.

The inner end 42 of the pin 30, which is the inaccessible end during setting of the rivet 10, is provided with an irregularly shaped head 44 formed integral with the shank 32 and of a short axial length compared to the length of the shank 32. The head 44, which is larger than the shank 32, has a pair of end sections 46 and 48 and an intermediate section 50 located between the end sections 46 and 48. The end section 46 is of a uniformly increasing diameter in a direction from the shank 32 toward the intermediate head section 50 and thus has an outer surface 52 inclined radially outwardly of the head 44 in the direction of the inner or inaccessible end 53 of the rivet 10. The intermediate section 50 is of a uniform diameter and has a radial projection 54 formed on one side 56 of the section 50. The projection 54 is of a progressively decreasing thickness towards the ends thereof (Fig. 3), since the outer edge 59 of the projection 54 is generated about a center axis 57 located to one side of the longitudinal axis 58 of the pin 30. As best appears in Fig. 1, the outer surface 55 of the projection 54 is inclined radially outwardly at the same angle as the end section 46 so that the projection constitutes an outward extension of the section 46. As a result, inclined lines 61 appear at the junctures of the projection surface 55 and the surface of the cylindrical intermediate section 50.

The end section 48 is of a uniformly decreasing diameter in a direction toward the terminal end 53 of the pin so that the outer surface 49 is inclined radially inwardly toward the terminal end 53. As clearly appears in Fig. 1, the portion of the surface 49 diametrically opposite the center 62 of the projection 54 is substantially parallel to the projection surface 55 at the projection center 62. For reasons that will more clearly appear hereinafter, it is not necessary that the surfaces be exactly parallel, only that they extend generally in the same direction and be disposed at an angle of substantially less than ninety degrees relative to each other and the pin axis 58.

In use, a suitable pull gun or tool is engaged with the shank 32 at the pull grooves 36 to first pull the head 44 against the inaccessible end 64 of the sleeve 20 (Fig. 4) so that the enlarged shank portion 38 is moved into the sleeve 20. As the shank portion 38 is moved into the sleeve 20, the sleeve is progressively expanded so that it fits tightly within the openings 12 and 14 in the plates 16 and 18 to eliminate the clearance space between the sleeve and the plates (Fig. 5). Furthermore, as the head 44 is moved into the sleeve 22, the substantially parallel portions of the surfaces 55 and 49 cooperate to provide for a tilting or tipping of the sleeve 20 in a direction parallel to this portion of the surface 55. As shown in Fig. 6, in the fully set position of the rivet 10, the sleeve 20 is tipped to a position against the head surface 49 in a position blocking movement of the pin 30 in a reverse direction, namely, a direction withdrawing the head 44 from the sleeve 20.

During setting of the rivet 10, the resistance of the pin 30 to movement in response to the pull thereon continually increases until the pin 30 reaches the stop position shown in Fig. 6, at which time the pull fractures the pin at a breakoff groove 66 in the shank 32. The pin may then be trimmed off as shown in Fig. 6 so that the outer end thereof is flush with the head 24 on the sleeve 22.

It is apparent that the arrangement of the projection 54 radially outwardly of the shank 32 and the outward inclination of the surface 55 relative to the longitudinal axis 58 of the pin 30 provides the desired tilting of the sleeve 22. Furthermore, the inward inclination of the portion of the head 44 diametrically opposite and above the surface 55 provides a clearance space for inward movement of the adjacent portion of the sleeve 22 into a following relation with the head 44 to positively block and effectively prevent movement of the pin in a direction to loosen the rivet 10. Any loosening movement of the pin 30 is prevented by moving the sleeve into engagement with the surface 49. To insure an engagement of the sleeve with the surface 49, therefore, the surface 49 is inclined at a slightly lesser angle relative to the pin axis 58 than is the projection surface 55.

A second or modified form of blind rivet of this invention is illustrated in Fig. 7 positioned within a pair of aligned openings 72 and 74 in a pair of plates or panels 76 and 78. The rivet 70 includes a sleeve member 80 like the sleeve member 20 previously described in connection with the rivet 10. The sleeve member 80 has a tubular body portion 82 of a size to be received in the openings 72 and 74 with a small clearance as illustrated in Fig. 7 and an enlarged annular head 84 of conventional shape on the accessible end 86 of the body 22.

The rivet 70 also includes an elongated pin or stem 90 extending axially through the sleeve 80 like the pin 30 in the rivet 10 previously described. The pin 90 has an elongated cylindrical shank 92 provided with an outer end section 94 of a diameter to provide for a sliding fit thereof in the tubular body portion 82 of the sleeve 80. The section 94 of the shank 92 also has the usual pull grooves 96. An inner end section 98 of the shank 92 is of a slightly larger diameter than the section 94 and is connected to the section 94 by a short tapered section 100 to facilitate movement of the shank section 98 into the sleeve 80 in the manner previously described in connection with the rivet 10.

The inner end 102 of the pin 90, which is the inaccessible end during setting of the rivet 70, is inclined relative to a diameter of the pin and is provided with an irregularly shaped head 104 formed integral with the shank 92 and of a short axial length compared to the length of the shank 92. The head 104 has a substantially cylindrical section 106 having a longitudinal axis 107 and a somewhat conical shape section 108 positioned between the section 106 and the shank 92. The cylindrical section 106 is enlarged relative to the adjacent shank section 98 and is positioned eccentrically relative to the shank section 98 such that these sections are tangent and are connected at the point 101 (Figs. 8 and 9). The surface 110 of the conical head section 108 is inclined from the cylindrical head section 106 toward the shank 92 in a direction radially inwardly of the pin 90.

As a result of the eccentric position of the head section 106 relative to the shank section 98, the inclination of the surface 110, relative to the longitudinal axis 111 of the pin 90, is progressively increased in both directions from the point 101. As a result, the surface 110 has its longest length and its greatest inclination relative to the longitudinal axis 111 of the pin 90 at the side 112 of the pin 90 diametrically opposite the point 101.

At the side 114 of the pin 90 diametrically opposite the side 112, the head section 106 is provided with a flat inclined surface 116, which is inclined in generally the same direction as the conical surface 110 at the side 112 of the pin 30. In other words, the surface 116 is inclined radially inwardly of the head 104 in a direction toward the terminal inner end 102 of the pin 90. As best appears in Fig. 8, the surface 116 is centered relative to the point 101 in a direction transversely of the pin head 104.

In use, a suitable pull gun or tool is engaged with the shank 92 at the pull grooves 96 to first pull the pin head 104 against the inaccessible end 124 of the sleeve 80 (Fig. 11) so that the enlarged shank portion 98 is progressively moved into the sleeve 80. By virtue of the enlarged size of the shank 92 relative to the sleeve 80, the sleeve is progressively expanded so that it fits tightly within the openings 72 and 74 in the plates 76 and 78 to eliminate the clearance space between the sleeve and the plates (Fig. 12).

Furthermore, during movement of the pin head 104 into the sleeve 80, the surface portion 110 diametrically opposite the point 101 on the pin head 104 moves against one side of the sleeve 80 to tilt the sleeve in the direction of the surface 110, namely, toward the right as viewed in Figs. 11, 12 and 13. As shown in Fig. 13, in the fully set position of the rivet 70, a portion of the sleeve 80 is tipped to a position against the flat surface 116 on the head 104 to block movement of the pin 90 in a reverse direction withdrawing the head 104 from the sleeve 80. In other words, the portion of the surface 110 at the side 112 of the pin 90 cooperates with the flat head surface 116 in a manner similar to the cooperation of the surfaces 55 and 49 for the rivet 10 described above. The movement of a portion of the sleeve 80 against the flat surface 116 prevents any loosening movement of the pin 90. Also, to insure an engagement of this sleeve portion with the surface 116 to eliminate any play between the pin 90 and the sleeve 80, the surface 116 is inclined at a slightly lesser angle relative to the pin axis 111 than is the surface 110 at the side 112 of the pin 90. A breakoff groove 126 in the pin 90 provides for the desired fracture of the shank 92 in the stop position of the pin shown in Fig. 13.

From the above description, it is seen that this invention provides a pair of blind rivets 10 and 70 which rely on a tilting of the corresponding sleeves 20 and 80 during setting of the rivets 10 and 70 to effectively prevent the pins 30 and 90, respectively, from working loose in the sleeves 20 and 80. Both rivets achieve this tilting of the sleeve by forming one side of the pin head with an outwardly inclined projection. In the rivet 10 this projection is in the form of the eccentric projection 54 and in the rivet 70 the somewhat conical head section 108. By relieving the side of the pin head on the side of the pin diametrically opposite the inclined pin projection, the sleeve is moved against the pin head in a position to block movement of the pin in a direction out of the sleeve. Accordingly, the sleeve acts to block the pin head to effectively insure an assembly relation of the rivet parts for prolonged periods. The rivets 10 and 70 are of a shape to provide for an accumulation of sleeve material, as indicated at 59 and 119 in Figs. 6 and 13, about the plate openings 12 and 72, respectively, to prevent accidental movement of the sleeve through the plate openings. By virtue of the shape of the head 44, with the portion 50 thereof located outwardly of the shank 32 at the side opposite the projection 54, a full sheet bearing for the rivet on the blind side is insured. In other words, an enlargement of the sleeve enough to provide full bearing with the sheet 16 is provided.

Both rivets are economically formed by a cold heading process and are of shapes which facilitate such forming. The tapered end section 48 of the pin head for the rivet 10 provides for an easier forming of the necessary dies for the pin head 44 than the pin head 104 which has the flat surface 116.

Although the invention has been described with respect to several embodiments thereof, it is to be understood that it is not to be so limited, since changes can be made therein which are within the scope of the appended claims.

What is claimed is:

1. A blind fastener adapted to be positioned in work from an accessible side and having another side, said fastener comprising a tubular body having an accessible head on one end adapted to engage the accessible side of the work and being of a length sufficient to pass through said work so that an opposite end portion thereof is disposed on said other side of the work, a pin having a shank and an enlarged head at one end of said shank of a diameter greater than the inner diameter of said body end portion but not substantially greater than the outer diameter of said body end portion and pull means at the opposite end of the shank, said shank extending coaxially through and guidably supported in said tubular body so that said head is positioned outwardly of said body end portion and said pull means is positioned outwardly of said head on the body, said pin head being shaped so that the surface thereof axially next to said body end portion is inclined radially outwardly of the head in a direction away from said tubular body on one side of said head, said surface terminating at a plane extending transversely of said pin and intersecting said plane at a point spaced from the axis of said pin and body a distance greater than the distance the side of said head radially opposite therefrom is spaced from said axis and a distance greater than the radius of the inner diameter of said tubular body end portion, said head axially outwardly of said point being radially within the confines of a projection of said inclined surface in a direction axially outwardly toward the terminal end of said pin, the side surface of said head substantially perpendicularly and diametrically opposite said outwardly inclined surface being relieved at the terminal end of said pin head so that at least a portion of said opposite side of the pin head is substantially parallel to a line extending longitudinally of said pin head along said inclined surface, whereby on movement of said shank in a direction to move said head into said end portion the end portion is inclined in a direction substantially parallel to said inclined surface to form a head on said other side of the work, and provide for movement of said body end portion adjacent to said opposite side of of said pin head into a position in engagement with said relieved portion on inclination of said body end portion to thereby block movement of said head in a reverse direction out of said end portion.

2. The structure of claim 1 in which said pin head has a main portion which is of an enlarged diameter relative to said shank, a radial projection on said one side of said main portion arranged in an eccentric relation with said shank, said head having a connecting portion formed integral with and extending between said main portion and the adjacent end of the shank, said outwardly inclined surface being disposed on said one side of said head and extending along both of said portions from said radial projection to said adjacent shank end, said head being of a progressively reduced diameter axially outwardly from said main portion to form said relieved side surface.

3. The structure of claim 1 in which said head is of a larger diameter than the diameter of said shank and is arranged in an eccentric relation therewith so that the head extends radially outwardly of said shank on said one side of the head, said head and shank being arranged in a substantially tangential relation at the opposite side of said head, said outwardly inclined surface extending between said head and the adjacent end of the shank on said one side of the shank, and said head having a substantially flat surface formed on said opposite side thereof at the terminal end of the head whereby to relieve said terminal end.

References Cited in the file of this patent
UNITED STATES PATENTS

| | | |
|---|---|---|
| 1,353,714 | Bohling | Sept. 21, 1920 |
| 2,756,624 | Austin | July 31, 1956 |